Patented Sept. 6, 1932

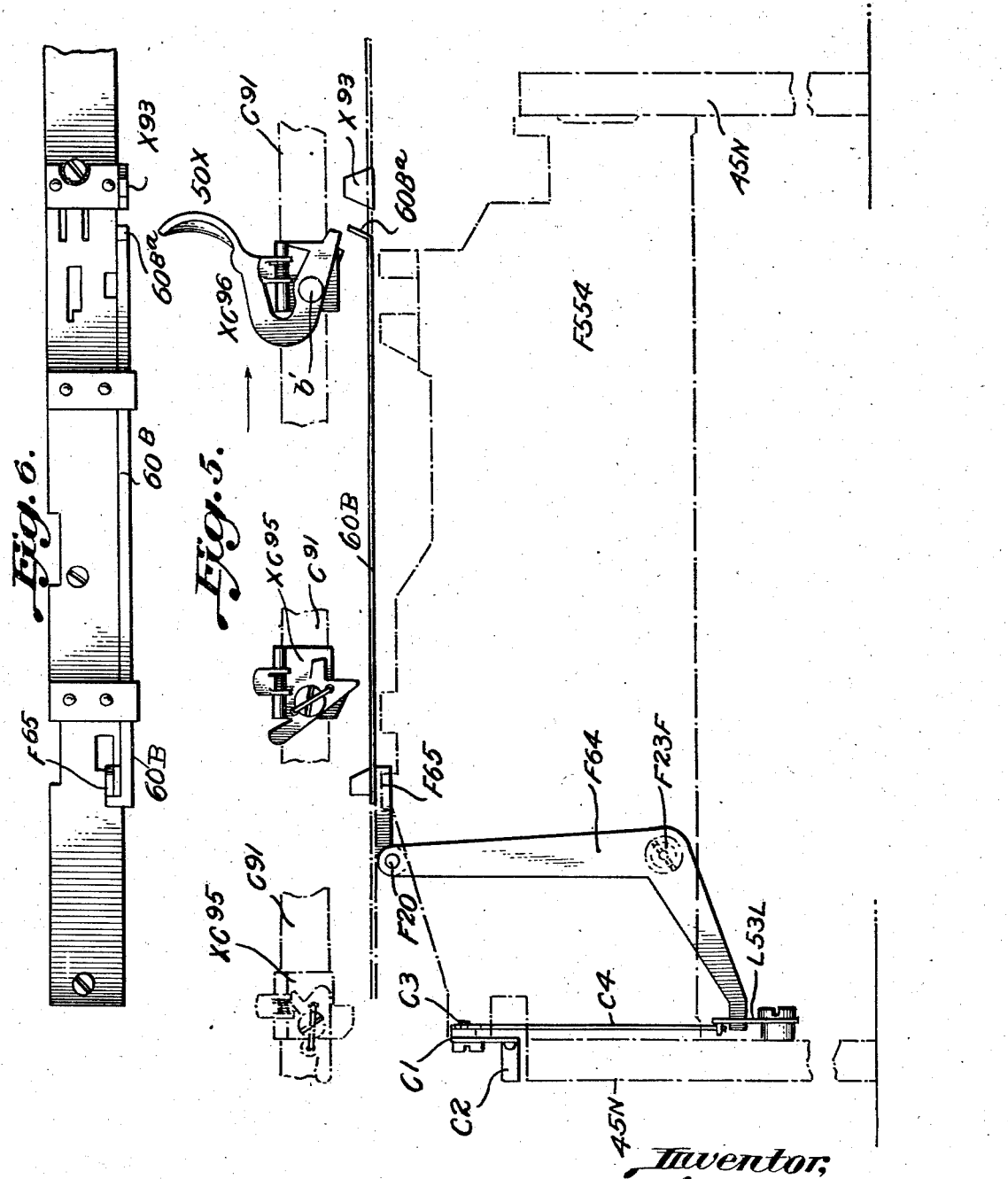

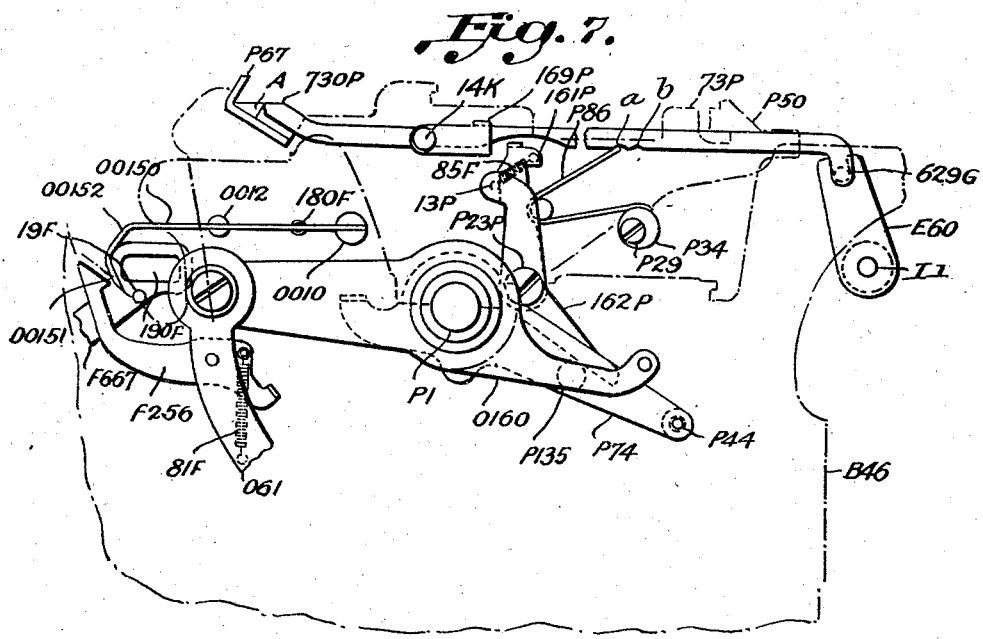
Fig. 7.
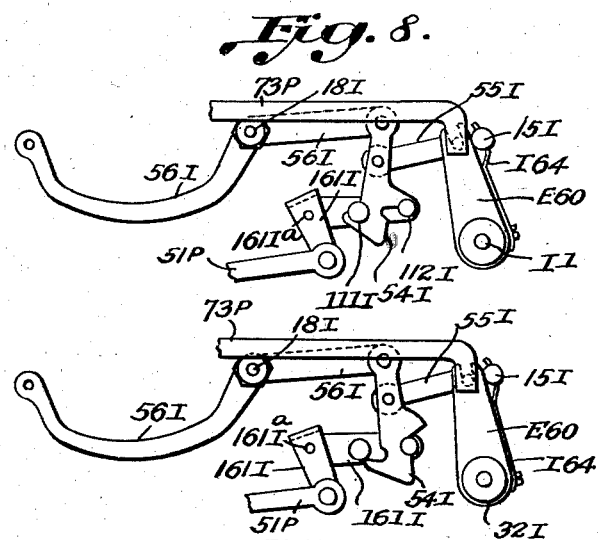
Fig. 8.
Fig. 9.

1,875,913

UNITED STATES PATENT OFFICE

FREDERICK W. BERNAU, OF HILLSIDE, NEW JERSEY, ASSIGNOR TO ELLIS ADDING TYPEWRITER COMPANY, OF NEWARK, NEW JERSEY, A CORPORATION OF NEW JERSEY

CARRIAGE CONTROL OF RIBBON SHIFT MECHANISMS

Original application filed October 31, 1922, Serial No. 598,155. Divided and this application filed September 16, 1929. Serial No. 393,105.

The present application is a division of my Patent No. 1,731,701, dated October 15, 1929.

This invention relates to calculating machines which are adapted for performing addition and subtraction, and if desired, for listing numbers, and for printing the results of addition and subtraction carried on by the machine.

My present improvements being particularly intended for use in connection with the mechanisms of the well known "Ellis" printing calculating machine, especially the mechanisms set forth in patents to Halcolm Ellis No. 1,065,792, June 24, 1913, total signal device; No. 1,197,276, September 5, 1916, combined adding machine and typewriter; and No. 1,203,863, November 7, 1916, mechanical calculator, are described and illustrated in connection with so much of these patented machines as will afford a clear understanding of the constructions, operations, functions and principles involved in the invention.

It is to be understood, however, that the present improvements and the principles involved therein are not, necessarily, restricted to embodiment in mechanism similar to the "Ellis" machine as these improvements may be used in other calculating machines and the claims are to be understood as covering any improvements involving the principles of the invention in whatever calculating machine they may be employed.

The Ellis Patent No. 1,203,863, dated November 7, 1916, provides a subtraction key in addition to the usual controlling keys of the Ellis machine; furthermore, both of the accumulators shown in that patent are adapted for the performance of either addition or subtraction.

In the present invention I prefer to have one of the accumulators adapted for both addition and subtraction, as with the accumulators of the machine of the Ellis Patent No. 1,203,863, and to employ for the other accumulator a straight adding accumulator. The straight adding accumulator may be of the construction set forth in my Patent No. 1,536,757, dated May 5, 1925.

It is to be understood, however, that both of the accumulators employed in connection with the present improvements may be adapted for both addition and subtraction as, for instance, in Ellis Patent No. 1,203,863.

While the subtraction key may be otherwise arranged, I prefer to substitute it for one of the controlling keys, for instance, the "Dr." sub-total key. Of the other controlling keys of the Ellis machine, the sub-total and total keys may be suitably labeled to represent the "total deposits" and the "balance", respectively, and another of the keys may be labeled to represent the "total checks", to particularly adapt the machine for use in bank work.

As described and shown the subtraction key of the present machine is adapted to become automatically restored after the machine has gone through its cycle of operation, making it necessary for the operator to hold down the subtraction key by the finger if a series of subtracting operations are to be carried on consecutively but as it is a simple matter to provide latching means for holding down the subtraction key, when it is desired to carry on a series of subtracting operations, it is to be understood that such latch may be used. In ordinary bank accounting, it is generally inadvisable to provide means for latching the subtracting key as this opens the way for forgetfulness on the part of the operator which would result in improper operation in that class of work.

In the application for my Patent No. 1,550,945, August 25, 1925, operating controls for calculating machines, reference was made to the fact that when the manually held stop thereof was operated by the operator returning the carriage to the credit column, means could be employed to cause the first following item printed by the machine to be printed in a distinctive color, as for instance, red, to denote a credit item.

The present improvements relate to mechanism for effectuating the foregoing purpose.

To that end novel means is provided for printing the item in a distinguishing fashion, as in a different color, for instance red, and, also, identified by a sign or signal so that the item will be marked in a distinguishing manner on any carbon copies, such distinguishing printing occurring on the next operation of the machine.

The means employed comprises a bichrome inked ribbon, ribbon vibrator therefor, and novel means which is automatically set to condition the bichrome ribbon mechanism for red or color printing on the next operation of the machine following the action of a controlling stop on the carriage. This mechanism is combined, with means for setting the subtraction key such as set forth in my Patent No. 1,550,945.

This special mechanism is automatically restored to normal position when the machine goes through its cycle of operations on pulling the handle thereof or touching the starting bar which controls the electric motor drive.

Certain of the present improvements relate to special mechanism combined with the subtraction key and comprise mechanism, substituted for certain of the pieces, cams, and levers of the machine of Ellis Patent No. 1,203,863 and, additional thereto, a link and a special hook or pawl by which the parts are conditioned so that the accumulator is brought into a condition by which it will perform subtraction on the next operation of the machine. It is to be understood that the foregoing mechanism does not interfere with the carrying on of addition in the straight adding accumulator as, if both adding and subtracting accumulator and straight adding accumulator are employed, subtraction can be carried on in one accumulator while addition is being performed in the other accumulator. Furthermore, a total can be taken from one accumulator, the amount of which may be subtracted from the accumulation of the remaining accumulator.

The present improvements being additional to the mechanism of the Ellis machine, reference is to be had to the aforementioned Ellis patents for a full disclosure of all mechanisms and their operations which are directly or indirectly related to said improvements. In the following description and accompanying drawings reference is made to only so much of the patented Ellis machine as will afford a clear understanding of the relationship of the present improvements thereto.

I am aware that modifications may be resorted to in carrying out the essential principles of the various improvements hereinbefore outlined and which are hereinafter specifically described and are shown in the accompanying drawings. It is to be understood, therefore, that the constructions specifically described and shown, while the preferred embodiments of the invention as at present devised by me, are susceptible of modification in many respects without departing from the essential principles thereof.

In the accompanying drawings:

Fig. 5 is a front elevation of those parts of the present invention which are carried by the carriage and frame of the machine and are used to set the subtraction key to effect at will the printing of items in a distinctive color;

Fig. 6 is a plan view of certain parts of the mechanism of Fig. 5;

Fig. 7 is an elevation of certain parts of the mechanisms shown in Fig. 4, the parts being as they appear at the end of the forward stroke of the operating shaft;

Fig. 8 is a detail side elevation of the ribbon shift mechanism when in normal position for causing ordinary printing, say in black, to occur;

Fig. 9 is a similar view showing the mechanism so arranged that the ribbon vibrator will be shifted to cause printing in a distinctive color, say red, as when the parts are set by the operation of the present mechanism;

As set forth in Ellis Patents No. 1,197,276 and No. 1,203,863, the machine is driven or operated, either by a handle, or by an electric drive, neither of which is shown, from a shaft O1. In the accompanying drawings only so much of the patented Ellis machine is shown as will afford a clear understanding of the relation of the present improvements thereto. Modern calculating machines, particularly those intended for loose leaf ledger work, are electrically driven and controlled by a starting bar. I have, therefore, illustrated starting bar mechanism for the control of the electric drive, such mechanism appearing in Figs. 2, 3, 4.

Secured to shaft P1 which is mounted in the frame and in the side plate P50 of the printing section is a crank O160 which is operated from the piece MO51 by the printing pitman O61. Carried by the shaft P1 is the paper feed lever P74.

Figures 10, 11:
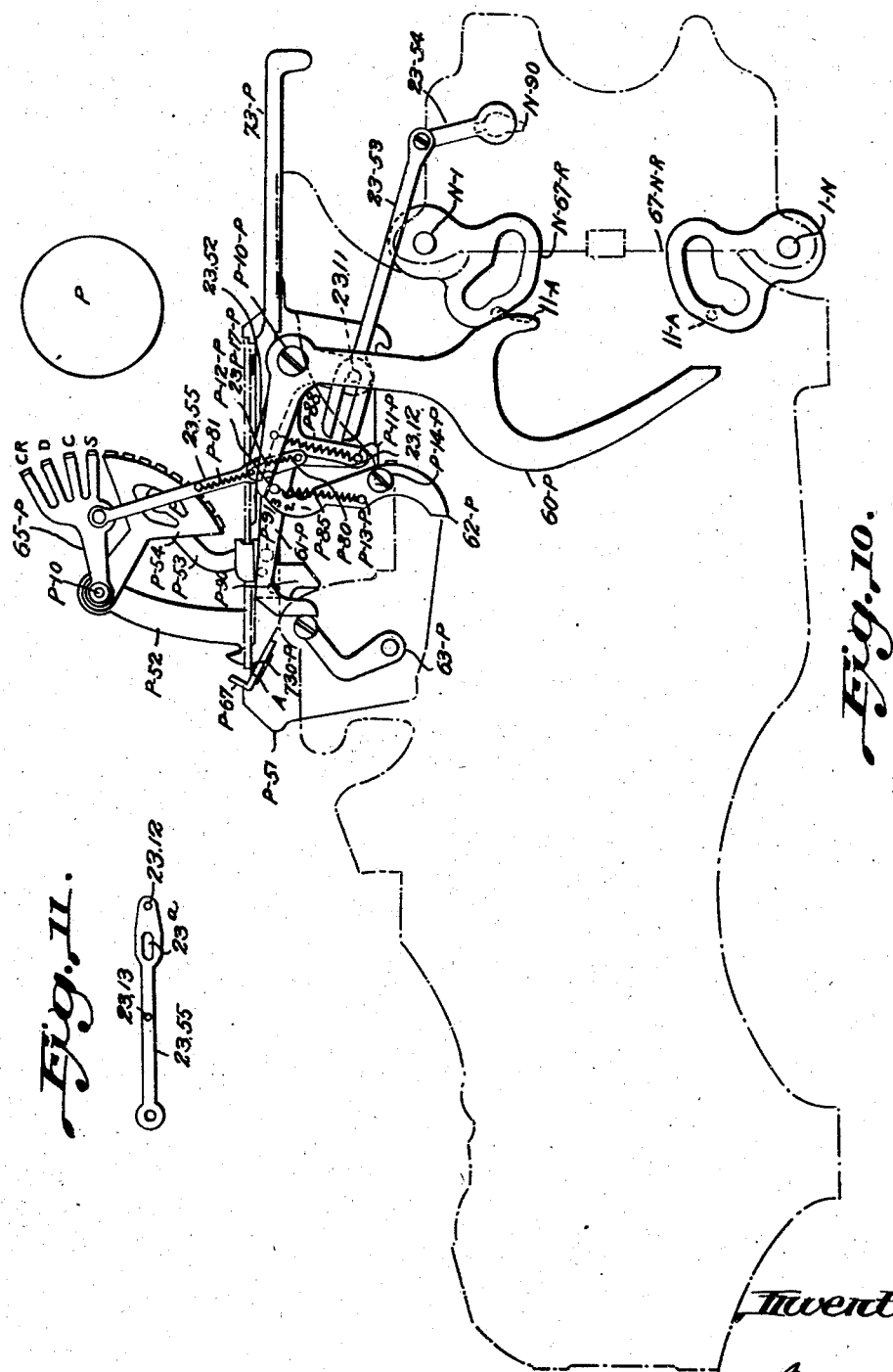
Fig. 10 is a side elevation of mechanism for automatically printing identifying signs or "signals," the parts being in position to print a subtracting sign, as when the subtraction key has been set by carriage position.
Fig. 11 is a detail view of a link shown in Fig. 10.

Referring to Fig. 10, the signal setting arm which is moved by the cams N67R and 67NR that swing the frames of the wheels of the accumulators as shown in Ellis Patent No. 1,065,792, appears at 60P. One of the printing type sectors is shown at P54, pivoted to arm 52P at P10 and adapted to be set by link P53; the signal 65P which is pivoted to arm P52 at P10, is operated by link 23.55 by improved means hereinafter described, of which the signal lever 61P pivoted at P10P constitutes a part.

The decimal slide P67 is operated by a slide B53 connected to the hook P68 of the slide P67.

The lever P272 (Figs. 2, 3, 4) controls the automatic turning of the platen.

Figure 1:
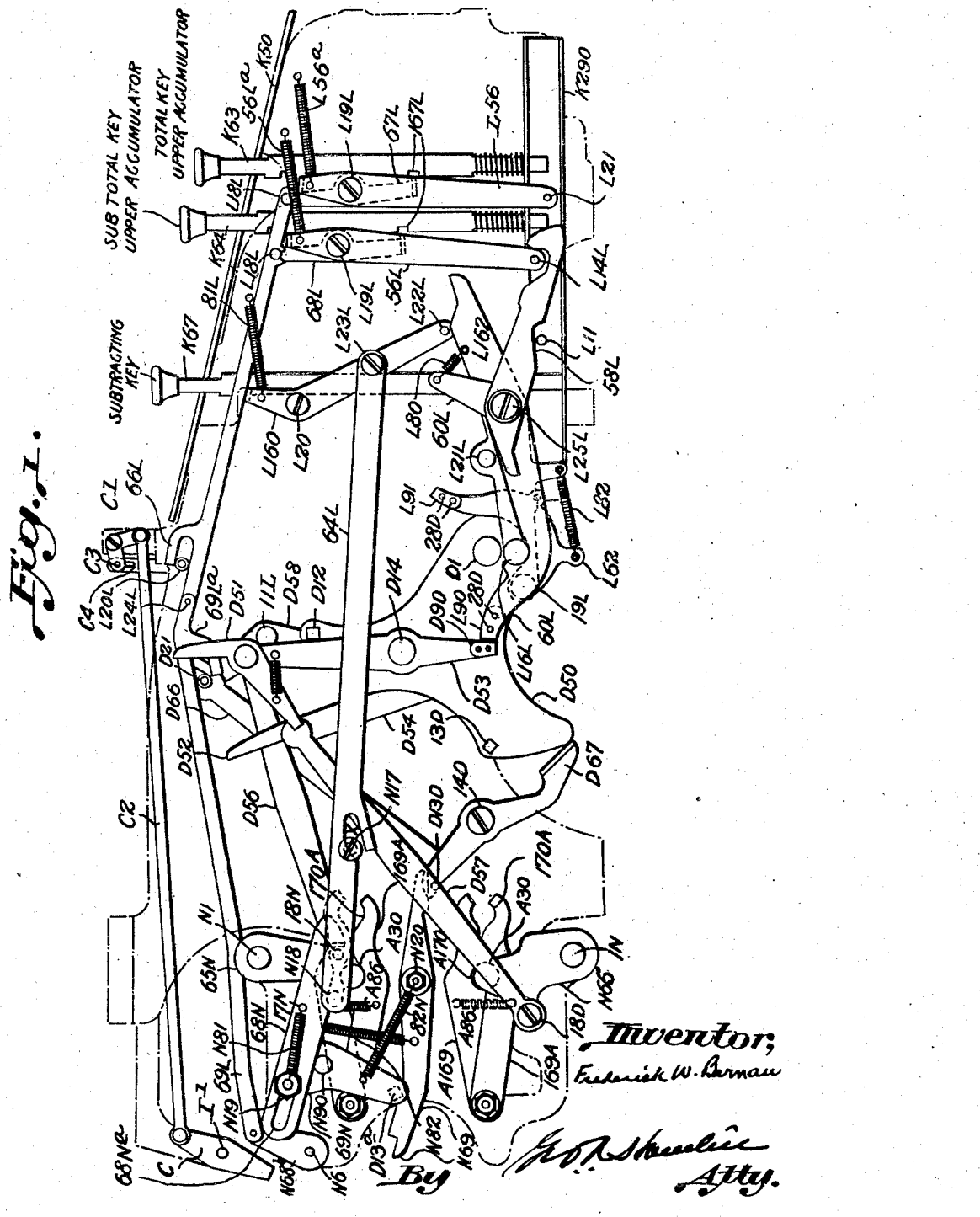
Figure 1 is an elevation of the left-hand side of the machine, showing certain mechanisms of the patented Ellis machine, in connection with the improved mechanism which co-operates with the carriage and with the subtraction key, the said key being in depressed position and the mechanisms controlled thereby, in their set condition.

A plate D50 which is secured to the left hand end of the operating shaft O1, Fig. 1, affords the means by which the motion of said shaft is utilized for the operation of the accumulators, according to the controls effected by the various controlling keys.

Figure 2:
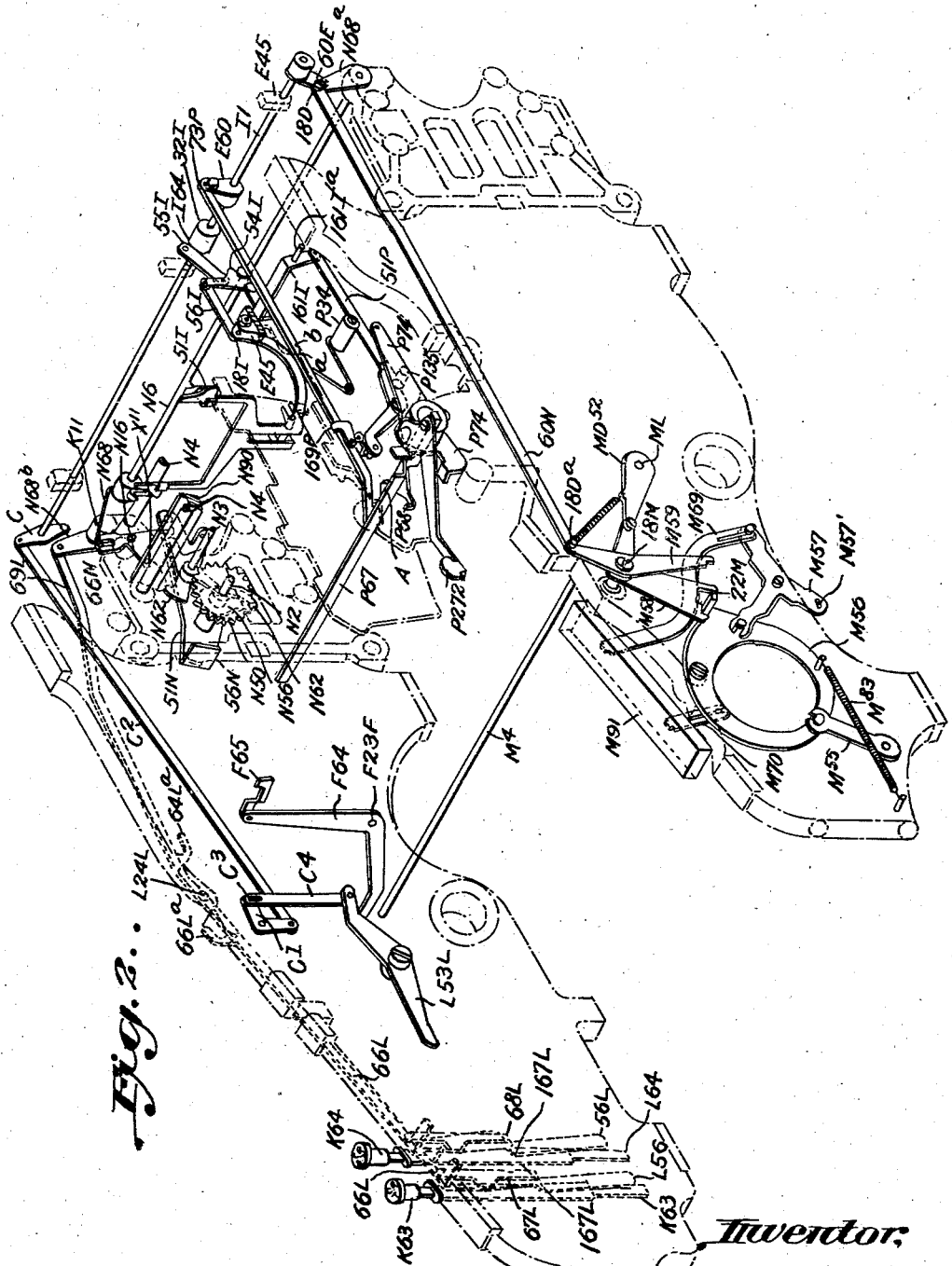
Fig. 2 is a perspective view, the side frames of the machine being in dotted lines, showing certain parts of the present improvements and also certain other mechanisms of the machine.
Figure 3:
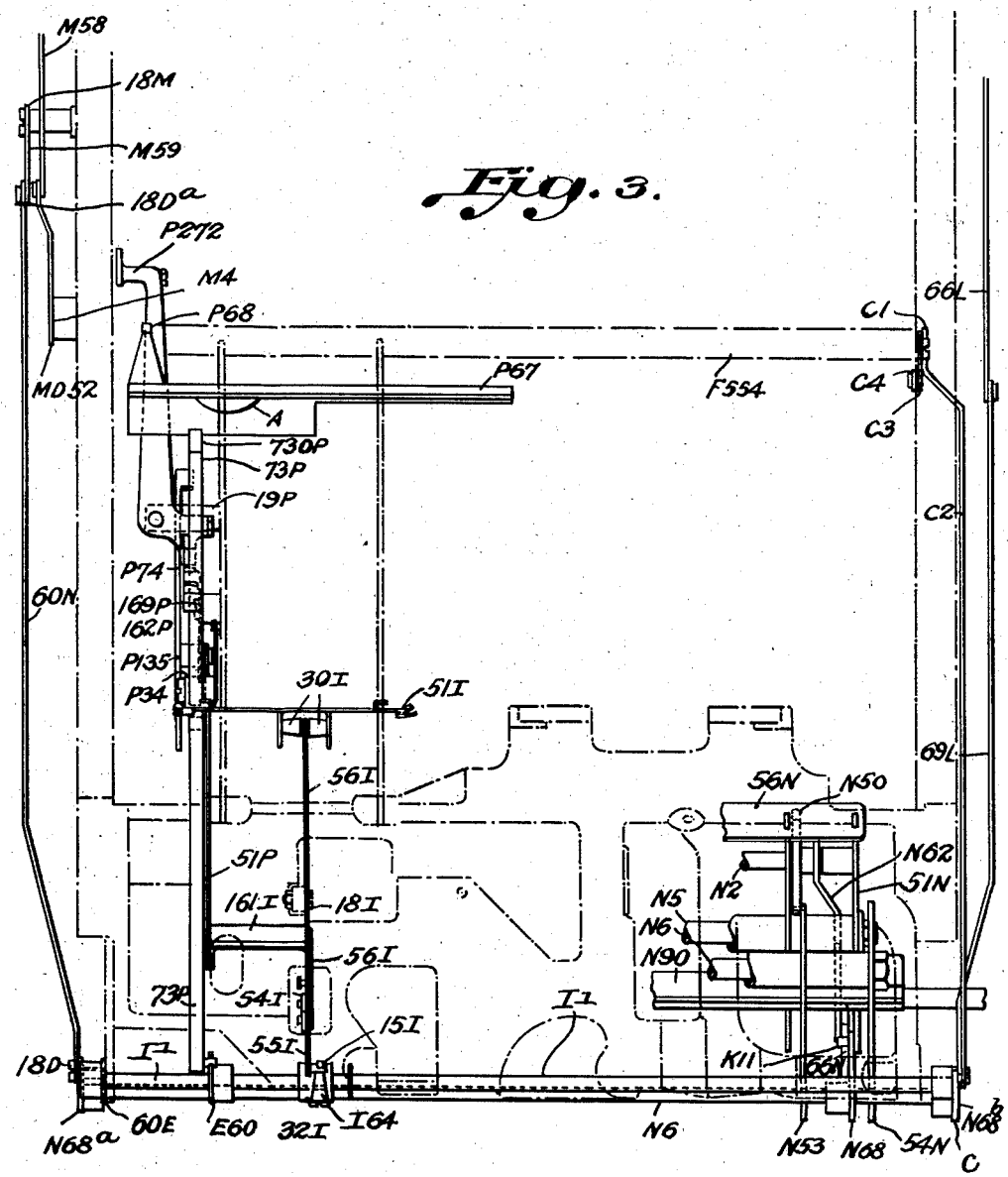
Fig. 3 is a plan view showing the relationship of certain parts of the present invention to other parts of the machine, the decimal slide having been moved to the left.

Such of the present improvements as relate to the controlling keys, including the subtraction key K67, the balance or total key K63 for the upper accumulator, and the sub-total key or total deposits key K64 are shown in Figs. 1 and 2.

The lower accumulator is not shown in detail. This accumulator is controlled only for purposes of addition and will be constructed as set forth in my Patent No. 1,536,757, dated May 5, 1925. It is to be understood, however, that the lower accumulator may be a combined adding and subtracting accumulator as disclosed in Ellis Patent No. 1,203,863 as additional mechanism could be employed so that subtraction as well as addition could be carried on in the lower accumulator in connection with the present invention.

Figure 4:
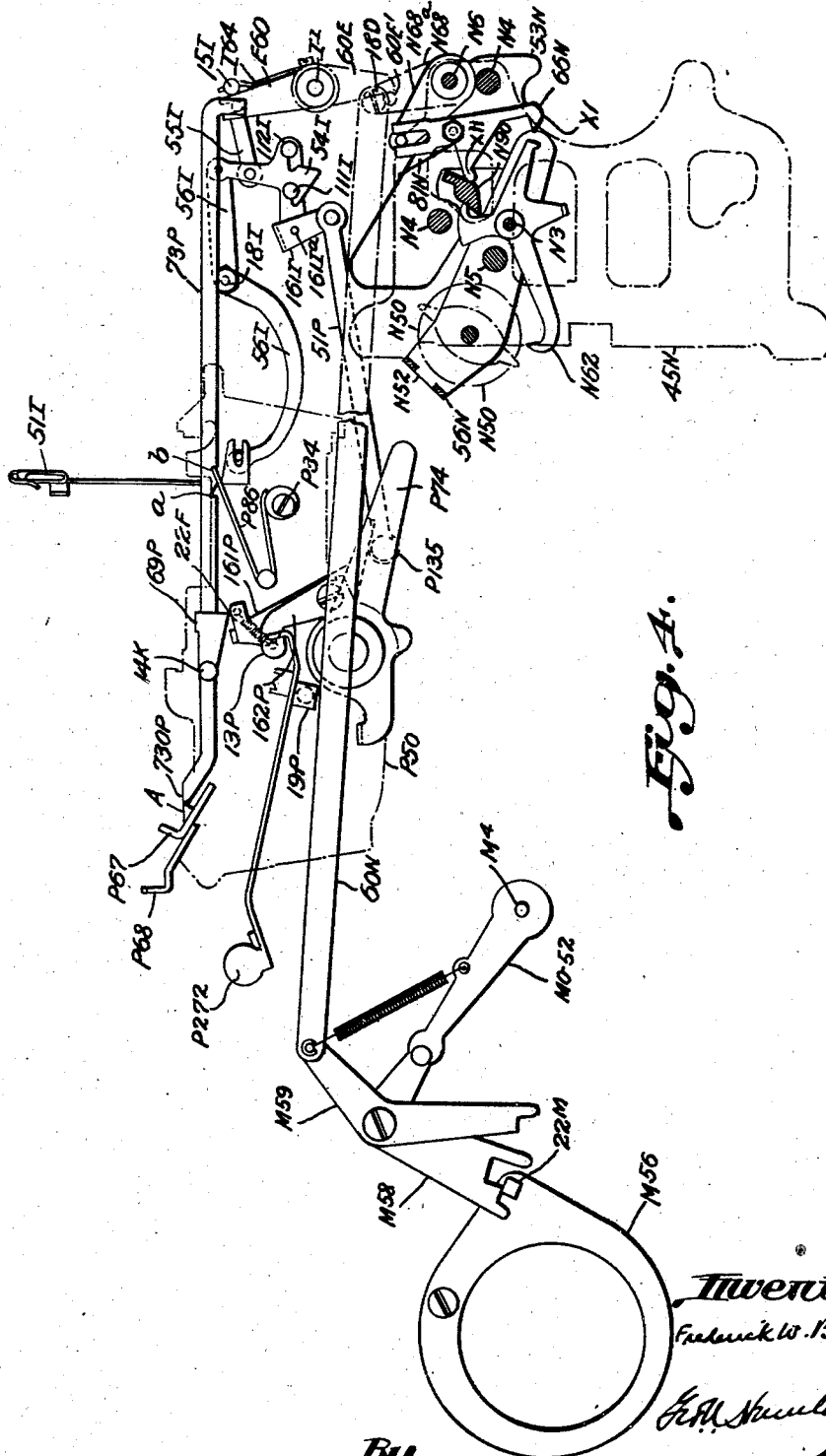
Fig. 4 is a part side elevation and part sectional view, showing the ribbon shift mechanism in normal position, and other associated mechanisms, also, an accumulator, set for addition.

Only so much of the upper combined adding and subtracting accumulator is shown in Figs. 2 and 4 as will afford a clear understanding of the operation. Reference is to be had to Ellis Patent No. 1,203,863 for a detailed disclosure of the general construction and principle of the upper adding and subtracting accumulator.

*The subtraction key and subtracting mechanism*

The key used for setting the machine so that subtraction may be performed in the upper accumulator is shown at K67 in Fg. 1, this key being, in the present instance, substituted for the Dr. sub-total key K67 of the lower accumulator of the Ellis Patent No. 1,197,276. It is not essential, however, that the Dr. sub-total key of the lower accumulator be dispensed with. A latch L160 which is actuated by spring 81L and is pivoted at L20, is adapted to latch the subtraction key K67 when the latter is in depressed position. Pivotally connected to the latch L160 at L23L is a long set link 64L which is provided at N18 with a pin and is provided at X with a cam slot so fashioned and located that the set link is normally sustained by a screw pin N17 projecting from the frame B47 and on which said set link rests. When the subtraction key K67 is depressed, however, the movement of the set link 64L to the left, causes the screw pin N17 to enter the cam slot X which thereupon allows the set link to drop to the position shown in Fig. 1. The shafts N1 and 1N carry the cams N67R and 67NR which swing the wheels of the upper and lower accumulators into and out of engagement with the adding racks or actuators, as explained in Ellis Patent No. 1,203,863, and carry on their ends the cranks 65N and N65, respectively. These cranks have rollers A30 adapted to be held in the rearwardly or forwardly arranged notches A170 and 170A of scissors like latching devices comprising pieces A169 and 169A which are drawn together by springs A86 connecting them as explained in my Patent No. 1,536,757, dated May 5, 1925 by which the accumulator is suitably held in its engaged and disengaged relation to the adding racks.

As shown in Figs. 2 and 4, the irregular shaped shift bar N90 of Patent No. 1,203,863 is employed and on the left hand end of this bar there is secured a crank lever 69N which has a square stud D13ª at its lower end and a stud N19 at its upper end. Spring 82N normally pulls the crank lever 69N in a counter-clockwise direction.

A subtracting operating hook 68N has a slot 68Nª by which it is slidably mounted on the pin N19. This hook is normally drawn rearwardly on the pin N19 by two contractile coil springs N81 located on opposite sides thereof and connected to the pin N19 and to a pin 17N on the hook. One of the springs N81 is obscured by the hook 68N in Fig. 1. A coil spring N82 which is connected to one of the pins 17N and to the subtracting detent N69, serves the double purpose of tending to draw the subtracting operating hook 68N downwardly and the subtracting detent N69 upwardly.

Referring again to Fig. 1, there is pivoted on a screw L25L a subtracting cam L162 which has a cam at its right hand end with which the pin L22L on the latch L160 normally engages, the said pin riding on the cam end of L162 and depressing said cam L162 when the subtraction key is depressed as shown in Fig. 1. A subtracting cam lever 60L is also pivoted on the screw L25L and is connected to the subtracting cam L162 by a contractile spring L80 which normally holds the left hand end of the subtracting cam lever 60L raised and in contact with a headed stud L16L on the subtracting cam L162.

A total cam lever 58L is pivoted on screw L25L and has its left hand end abutting a pin L21L projecting from the subtracting cam L162. The normal position of the total cam lever 58L is maintained by the engagement of the right hand cam notch thereof with pin L14L carried by the latch 56L for the sub-total or total deposits key K64, such latch and key being of the same general construction set forth in Ellis Patent No. 1,197,276. A spring 56L$^a$ normally draws the upper end of the latch 56L against the stem of key K64 so that when the key is depressed the latch will engage the notch thereof.

A hardened shoe L90 is secured by rivets 28D to the left hand end of the subtracting cam lever 60L for cooperation, when set by the keys K63, K64 and K67, with the hardened shoe D90 on the lower end of flying lever D53 which is pivotally mounted on the plate D50 at D14 and adapted to cooperate with the square studs D12, and 13D on said plate.

A total pawl L62 is pivoted on a stud 19L carried on the inner face of the subtracting cam L162, said total pawl having a pin 20L which extends underneath the subtracting cam L162. The total pawl L62 is normally held with the pin 20L abutting the lower edge of subtracting cam L162 by the action of a spring L82 connecting said total pawl to a projecting part of the subtracting cam L162. The total pawl L62 carries on its upper end a hardened shoe L91 secured by rivets 28D.

The total or balance key K63, is held, when depressed, by a latch L56 which is pivoted at L19L and is provided with a pin L21 adapted to be drawn against the end of the total cam 58L by the action of spring L56$^a$ when the key K63 is depressed.

*Setting the accumulator by subtraction key*

When the subtraction key K67 is depressed, it is immediately latched in its depressed position by the latch L160 whose operation results in parts assuming the positions shown in Fig. 1. The riding of the pin L22L on the subtracting cam L162 causes the whole system of mechanism associated with L162 to turn in a general clockwise direction, resulting in the total cam lever 58L becoming released from the pin L21L, the subtracting cam lever 60L to rise so that its shoe L90 is against the shoe D90 of the flying lever D53, and the total pawl L62 to become elevated so that it will be engaged by the shoe D90 at the end of the forward stroke of the shaft O1 and plate D50.

The movement of the latch L160 causes the set link 64L to shift toward the left, thereby allowing the screw guide pin N17 to enter the cam slot X. This results in the set link 64L dropping to the position shown in Fig. 1. Normally the lower edge of the subtracting operating hook 68N rests on the pin N18 so that said subtracting operating hook is held in elevated position. When, however, the set link 64L descends, as described, the subtracting operating hook 68N is allowed to drop so that it is positioned for engagement by a pin 18N on the crank 65N which turns the cams (not shown) that lower the wheels N50 into engagement with the adding racks of the machine at the proper time. The subtracting operating hook 68N is, by the movement of the set link 64L, thus conditioned so that it may be pulled toward the right when the crank 65N swings to the right.

*Subtracting operation*

The parts having thus been set, when the machine is operated, either by a handle or electric drive used for the purpose of turning shaft O1, the plate D50 which is normally in the position shown in Fig. 1 is turned to the right and then reverses its motion and resumes the position shown in Fig. 1. Before the return of the plate D50 to the normal position of Fig. 1, the substraction key K67 becomes restored and the subtracting cam L162 and subtracting cam lever 60L and total cam lever 58L all resume their normal positions.

In the Ellis machine set forth in Patents No. 1,197,276 and No. 1,203,863 when an operation of addition is to be performed, the adding racks or actuators advance, during the operation of the machine, as far as allowed by the setting of the numeral keys before the shafts N1, 1N, are turned (according to which accumulator is being used) for the purpose of engaging the wheels N50 with said racks. This action occurs, in an adding operation, when the plate D50 has moved through an angle of about 45°. The wheels N50 remain in engagement with the racks until the racks have returned to normal position, such return of the racks turning the adding wheels N50 according to the extent of travel of said racks.

When an operation of subtraction is to be performed, however, as the number is to be immediately deducted from any number set up on the wheels N50 during a previous operation of the machine, it becomes necessary to cause the wheels N50 to engage the racks before said racks move and to disengage the wheels N50 from the racks before the racks start to return to their normal position. In a subtracting operation, therefore, it is necessary to move the upper crank 65N to the right from the position shown in Fig. 1 before the racks have started to move.

The subtraction key having been set and the parts being in the position shown in Fig. 1, when the machine is operated, the swinging of the plate D50 in a clockwise direction results in a temporary arrest of the flying lever D53 because its lower end is temporarily blocked by the shoe L90 on the subtracting cam lever 60L. This results in lever D53 pulling upon link D56 which connects it to the crank 65N of the adding and subtracting accumulator, causing the shaft N1 to be turned and the frame 51N, 56N, which carries the shaft N2 to be moved and wheels N50 then mesh with the racks before the racks start to move. The roller A30 on crank 65N is drawn into the notches 170A so that the wheels N50 are retained in engagement with the racks. The movement of the connecting link D56 to the right from the position shown in Fig. 1 also results in the pin 18N pulling upon the subtraction operating hook 68N which, through the spring connections N81, pulls upon the pin N19 and thus turns the crank 69N and the shift bar N90, bringing the shift bar N90 to the subtracting position.

The first part of the movement of the plate D50 releases the restoring lever D67, allowing the spring N82 to snap the subtracting detent N69 upwardly so that the notch N69ª thereof engages the square stud D13ª on crank 69N.

During its clockwise movement, the plate D50 drags the lower end of flying lever D53 past the shoe L90 on the subtracting cam lever 60L so that after the accumulator has been set for subtraction and the wheels N50 engaged with the racks, the said flying lever D53 simply turns idly on its pivot D14 and exerts no further action on the crank 65N and hook 68N. The lower end of the lever D53 is finally drawn across the shoe L91 of the total pawl L62 and as this pawl is actuated by spring L82, it is slightly depressed, allowing the flying lever D53 to finally abut the shoe L91.

On the return stroke of the shaft O1, the plate D50 is turned in a counter-clockwise direction. The return movement of the plate D50 causes the lower end of lever D53 to press against the shoe L91 of the total pawl L62. The pressure being almost in a direct line with the pivot 19L of the total pawl L62, i. e., almost directly on a dead center, there is no tendency for the lever D53 to depress the total pawl L62 but, on the contrary, the total pawl L62 constitutes a solid abutment to temporarily resist the return of the lever D53 so that pressure is applied through lever D53 and connecting link D56 to the crank 65N, causing said crank to be returned to its normal position at the beginning of the return stroke of the plate D50, thereby resulting in the turning of shaft N1 and the raising of the frame 51N, 56N, and disengagement of the wheels N50 from the racks before the racks start to return to normal position. When the plate D50 returns to its normal position, it again engages the restoring lever D67 and causes the pin D13D to elevate the right hand end of the subtracting detent N69 and to withdraw it from engagement with the stud D13ª.

While no disclosure is given of means for latching down the subtraction key K67 for a series of repeated subtractions without requiring the operator to hold his finger on said key, such latching means may be provided, if desired. In the construction disclosed, the subtraction key K67 will instantly rise when the latch L160 is moved in a counter-clockwise direction. This action automatically occurs on the return stroke of the shaft O1 and plate D50.

Means, such as set forth in my Patent No. 1,731,701, may be provided for automatically releasing the latches 67L, 68L, L160 for the keys K63, K64, K67 on the return stroke of the plate D50; and means for releasing them by depressing the error key, may be used, as disclosed in that patent.

The releasing movement of the latch L160 in a counter-clockwise direction by means such as previously explained, causes the set link 64L to be drawn toward the right, out of the position shown in Fig. 1, whereupon the cam edges of the slot X cause the set link to ride on the pin N17 and resume its normal position. The rising of the set link 64L causes its pin N18 to elevate the subtracting hook 68N from the subtracting position to the adding position where it will remain as long as the subtraction key K67 remains in elevated position so that addition may be performed in the upper accumulator by depressing the proper controlling key provided in the Ellis machine.

When the plate D50 assumes its normal position, its engagement with the restoring lever D67 results in disengagement of the detent N69 from the lever 69N and the shift bar then returns to the adding position shown in Fig. 4.

When it is desired to subtract a series of items, the subtraction key is held in depressed position by the finger of the operator, the subtracting cam L162 and the subtracting cam lever 60L then remaining in the position shown in Fig. 1 by reason of the cooperation of pin L22L of latch L160 with subtracting cam L162. When the subtracting key is thus held down, at a time just prior to the plate D50 assuming its normal position on the return stroke, the lower end of the flying lever D53 strikes the upper side of the shoe L90 on the subtracting cam lever 60L but as the left hand end of said lever is held in raised position by spring L80, the return of the flying lever D53 to normal position merely slightly depresses the left hand end of cam lever 60L and then passes beyond it, finally assuming the position shown in Fig. 1.

Release of numeral keys

The numeral keys (not shown) which are fully disclosed as to construction and operation in Ellis Patent No. 1,197,276 are released, so that they may spring up to normal position, by means substantially similar to those shown in Ellis Patent No. 1,203,863. When addition or subtraction is being performed, the numeral keys are released on the return stroke of the shaft O1 and plate D50.

The adding or debit accumulator

In the drawings I have shown the operating mechanism for the lower or "Dr." accumulator in Fig. 1. This accumulator may be of the construction shown in my Patent No. 1,536,757 dated May 5, 1925. As previously explained the lower accumulator may be a combined adding and subtracting accumulator such as set forth in the Ellis Patent No. 1,203,863. In the present description and drawings I have not shown the controlling keys for the lower accumulator nor will specific description be given of the means by which the adding crank N65 of the lower accumulator is rocked to turn the shaft 1N which carries the cams 67NR that swing the lower accumulator wheels into mesh with the lower sides of the racks but the manner of operating said accumulator will be clear from the disclosures of the Ellis Patent No. 1,197,276 and the mechanism shown in Fig. 46 of that patent and also Fig. 3 of Ellis Patent No. 1,197,278. It is only necessary, for the purposes of the present invention to state that the rocking plate D50 operates the flying lever D54, connection D57 to the pin 18D of the crank N65 and that there is a piece D52 similar to the piece D51, said parts being located back of the plate D50 and serving, when the proper keys, not shown, are set, to enable the lower accumulator to be used for purposes of addition.

Assuming, therefore, that the lower accumulator is used as explained, it is possible with the present invention to subtract the total accumulation of the lower accumulator from the amount added in the upper or "Cr." accumulator.

Subtracting the amount in the debit accumulator from the amount in the credit accumulator For carrying on a subtracting operation, it is immaterial as to what means is used to limit the travel of the racks. If the lower or "Dr." accumulator is engaged with the racks for the purpose of taking a total while the "Cr." accumulator is engaged with said racks for the purpose of carrying on a subtracting operation, it is evident that the wheels of the "Dr." accumulator will limit the travel of the racks and that the precise extent of travel of the racks will be represented by a corresponding subtracting operation which will deduct the amount from what is contained in the "Cr." accumulator.

Pivoted to the order plate 53N of the highest order by a stud N16, is an overdraft lock latch 66N. A spring 81N which cooperates with the overdraft lock latch 66N and the order plate 53N, tends to swing the overdraft lock latch so that its point X' will move in a clockwise direction. This movement is prevented when the shift bar N90 is set for addition as shown in Fig. 4, there being a rounded projection X'' on the overdraft lock latch which is pressed downwardly by the shift bar N90 when the latter is set for addition. Consequently when the accumulator is set for addition as shown in Fig. 4, the pointed end X' performs no function.

However, when the shift bar N90 is set for subtraction, as will be the case when the subtraction key K67 is depressed and the machine operated, the turning of the shift bar N90 from the position shown in Fig. 4 relieves the pressure against the projection X'' and thereupon the spring 81N turns the overdraft lock latch 66N so that the point X' comes against the rear end of the subtracting pawl or hook N62 which arrests it.

The movement and position of the overdraft lock latch 66N controls signals or locks and distinctive printing of the overdraft amount as set forth in my Patents No. 1,508,267, dated September 9, 1924, No. 1,731,701, dated October 15, 1929, and Nos. 1,819,067 and 1,819,068, dated August 18, 1931, which constitute divisions of No. 1,731,701, by turning a crank N68 fast on a shaft N6.

Starting bar mechanism

The starting mechanism for the electric drive may be of the general construction shown in the patent to Perkins No. 1,136,165 although not precisely similar thereto. A substantially circular operating lever M56 is pivoted to the frame at 14M and is provided with a retracting spring M83. The link M55 operates means not necessary to describe. The three-armed pivoted lever M57 is the controlling device for the electric motor drive. The starting bar M91 is carried by pieces M69 and M70, the former being connected to the lever M57 and the latter to the circular lever M56. When the starting bar M91 is depressed, the circular lever M56 is turned against the tension of the spring M83 and the pin M57' releases the operative connection to the electric drive. On moving the hand from the starting bar M91, the parts are returned to normal position by spring M83. The starting bar is normally locked but is released when the controlling keys are operated, as set forth in the Ellis patents. Only so much of this normal locking mechanism is disclosed as will illustrate this feature. A shaft M4 extends across the machine to the mechanism on the left side which is under the control of the controlling keys. An arm MO52 is secured to shaft M4 and is pivotally connected to a bell crank locking device M58 which is adapted to engage a square stud 22M carried by the ring-shaped lever M56.

*Lock or signal for starting bar mechanism*

Pivoted on the same stud 18M which carries the lock M58, is locking lever M59. Secured to the overdraft shaft N6 is a crank N68$^a$. A long link 60N is pivoted at 18D to the crank N68$^a$ and at its forward end it is pivoted at 18D$^x$ to the locking lever M59.

By this means, the locking lever M59 is disengaged from the square stud 22M and hence the usual lock M58 is the only one which locks the lever M56 and as said lock M58 is released by setting of the controlling keys, there is normally no interference with the operation of the starting bar M91.

However, when the wheel N50 of the highest order has turned sufficiently to depress the subtracting hook or pawl N62, the overdraft latch 66N moves, which results in a backward turning of crank N68 and a backward turning of crank N68$^a$ on the overdraft shaft N6. Through the link 60N, this motion is communicated to the locking lever M59 which is thereupon swung so that its lower end will block the upward movement of the square stud 22M and hence the starting bar M91 cannot be depressed.

By this means the operator is notified that conditions in the upper accumulator represent an overdrawn condition of the account and the machine cannot be operated except by manipulation of the decimal slide P67.

The mechanism for locking the starting bar when an overdraft occurs is set forth in my Patents Nos. 1,731,701 and 1,819,068.

*Lock or signal for total or balance keys*

This mechanism which appears at the left of Fig. 2 (mainly in dotted lines), and also in Fig. 1, and is operated by the crank N68$^b$ on shaft N6, is set forth in my Patent No. 1,508,267, September 9, 1924, and in Patent No. 1,731,701, dated October 15, 1929.

*Means for releasing the overdraft lock or locks*

As previously stated the starting bar lock and the total and sub-total key locks remain in locked arrangement until the operator deliberately releases them which is done by manipulating the decimal slide P67 or other suitable means provided for that purpose. A shaft I1 which is suitably mounted in bearings on the machine frame carries a crank E60 which is provided with one or more set screws so that it can be adjusted for proper operation. A horizontally slidable set link 73P which is pivoted to the crank E60, has its beveled forward end 730P arranged back of the decimal slide P67 in position to be engaged by a double cam A carried by said decimal slide. Normally the decimal slide is in its right hand position as shown, so that there is no interference with the forward movement of the set link 73P when the overdraft shaft N6 turns to swing the cranks N68$^a$, N68$^b$, rearwardly to lock the starting bar M91 and the total and sub-total keys K63, K64. The set link 73P is moved to the rear to turn the shaft I1 and, through the cranks 60E and N68$^a$, N68$^b$, to unlock the starting bar and the keys K63, K64, by moving the decimal slide P67 so that the cam A thereof will engage the tip 730P of the set link 73P. By this means, the machine is unlocked so that it may be operated to print the number representing the overdraft or the complement thereof.

The movement of the decimal slide P67 to unlock the machine also sets ribbon mechanism for printing the overdraft in a distinguishing color, say red, as will now be described as it serves to prevent automatic tabulating movement of the carriage of the machine if the machine has the automatoc tabulating mechanism; it also sets the signal printer so that it will print an overdraft sign or signal on the next operation of the machine. The set link 73P is provided with notches $a$, $b$, adapted to receive the end of a bowed spring P86 which is connected to the side plate of the printing section and has an end engaged with a stud P34 thereof. This detent mechanism holds the set link 73P in either its forward or rearward position, as set, and prevents accidental movement thereof. Pivoted to the set link 73P by stud 14K is a triangular shaped return latch 169P with which certain mechanism hereafter described cooperates to shift the set link 73P forwardly.

*Ribbon shift mechanism and its operation*

The ribbon vibrator 51I is of the same general construction set forth in the Ellis Patent No. 1,197,276 but improved means are provided to cause the vibrator 51I to be automatically shifted to cause distinctive printing, say red, on the next succeeding operation of the machine after an overdraft and after the shifting of the set link 73P by moving the decimal slide P67.

As in the Ellis patent aforesaid, a rocker 56I pivoted at 18I to the top frame E45 of the machine is used to vertically vibrate the ribbon shift or vibrator 51I. Pivotally carried by a shaft 161I$^a$ which is mounted in the top frame is a double rocker arm 161I whose rearwardly extending arm is provided with two studs 111I and 112I (Figs. 2, 8, 9).

Pivotally suspended from the rear of the ribbon forked vibrator arm 56I is a ribbon shift arm 54I which has hook shaped slots on its forward and rearward edges respectively adapted to engage the studs 111I and 112I, at different times. The studs 111I and 112I are so spaced and the width of the ribbon shift arm 54I is such that said arm can be shifted forwardly or rearwardly for the purpose of engagement with one of the studs at a time. A shifting link 55I is pivoted to the ribbon shift arm 54I. A leaf spring I64 which is carried by a settable hub 32I on the shaft I1, has a hooked or bent part at its upper end which is received in a slot in a laterally extending stud or pin 15I carried by the shifting link 55I. There is thus provided a flexible operating connection from the shaft I1 to the ribbon shift arm 54I and the rocker 56I which operates the ribbon vibrator 51I.

Normally the set link 73P is in its forward position as shown in Fig. 4, for instance, the shift arm 54I then being in the position shown in Figs. 4 and 8, that is, engaged with the stud 111I. When thus set, the paper feed lever P74 through the link 51P which is pivoted thereto at P135 and is also pivoted to the downwardly extending arm of the double rocker 161I, causes normal operation of the ribbon fork or vibrator 51I.

When the decimal slide P67 is moved to bring its cam A against the end 730P of set link 73P, the rearward shifting of the set link 73P results in backward swinging of the crank E60 and turning of shaft I1 which not only unlocks the starting bar and the total and sub-total keys but also turns the hub 32I and the spring I64 rearwardly and shifts the arm 54I from the position shown in Fig. 8 to that shown in Fig. 9 so that the notch on the rear side of the arm 54I is engaged with the stud 112I. As the stud 112I is located farther back from the shaft 161I$^a$ than the stud 111I, when the machine is subsequently operated, the fork or vibrator 51I is elevated sufficiently to bring the other section of the bichrome ribbon, the red section for instance, in position to receive the impression of the printing type so that a distinctive printing takes place.

Referring to Figs. 4 and 7, pivoted to the right hand side plate P50 of the printing group by the screw P23P is a return latch 161P and a return lever 162P which are independently movable and are flexibly connected together by a spring 85F attached to studs 13P and 22F. The spring 85F tends to hold the front side of the return latch 161P against the pin 13P on the return lever 162P. The purpose of relative flexibility of the pieces 161P and 162P is to compensate for any unusual strain which would result if the decimal slide P67 is not in proper position when the machine is operated as, for instance, if it is left with the cam A engaged with the tip 730P of the set link 73P.

A spring 86P connects the operating return lever 162P and the clear signal lever 61P at a suitable position to apply the requisite tension to the lever 162P to hold the lower end of the lever against the pin P135 which is carried by the paper feed lever P74 as set forth in Patent No. 1,731,701 (Fig. 10).

As previously described, the set link or bar 73P is normally in the position shown in Fig. 4 but when an overdraft has occurred and the machine becomes locked as a result thereof, the operator shifts the decimal slide P67 to cause the cam A to engage the end 730P of the set link 73P to shift the set link 73P rearwardly to set the ribbon mechanism so that on the next operation of the machine the item representing an overdraft will appear in a distinctive color, say, red. For the purpose of returning the set link 73P to its normal position, the latch 161P and the return lever 162P are provided. When the machine is operated, the turning of the O1 shaft causes the printing pitman O61 to turn the crank O160 and as this is fixed on the same shaft with the paper feed lever P74, said lever is turned to the position shown in Fig. 7. The lowering of the stud P135 causes the tail of the return lever 162P to follow it by reason of the tension of spring 86P and the return latch 161P finally passes beyond the right hand end of the pivoted latch 169P carried by the set link 73P as explained in Patent No. 1,731,701. Therefore, on the return of the parts to the normal position, the latch 161P engages the latch 169P and first shifts the set link 73P back to the normal position and then slips past said latch 169P.

The forward stroke of the parts results in the paper feed lever P74 pulling upon the link 51P and rocking the double rocker 161I for the purpose of pulling downwardly the depending arm 54I and thus elevating the ribbon vibrator 51I. On the return stroke of the parts the paper feed lever P74 pushes on the link 51P and restores the ribbon vibrator 51I to normal position but without effect on the shaft I1 because of the use of the yielding spring I64 which prevents transmission of motion to said shaft I1.

The foregoing movements occur when numbers are being added, subtracted, or listed without being printed in a distinctive color, as under ordinary conditions of operation. The adaptability of the arm 54I to shift so that the leverage applied thereto in pulling said arm 54I downwardly will determine the extent of downward movement of said arm 54I, results in the ordinary, or in an unsual, extent of movement of the ribbon fork 51I according to the nature of the operation.

Without restricting this part of the invention to dimensions, in practice, if the arm or link 54I is engaged with the stud 111I, which is the normal condition, this stud being located nearest the shaft 161I$^a$, the upward travel of the ribbon, when the machine is operated, is about 5 mm., whereas if the arm or link 54I is engaged with the stud 112I, the greater distance of stud 112I from shaft 161I$^a$, results in about double the upward shift of the ribbon, say 10 mm. Consequently by the use of a bichrome ribbon arranged so that the more distinctive color is lowermost distinctive printing, as when an overdraft occurs, will only take place when the shaft I1 is turned backward. This occurs by shifting the slide bar or set link 73P by moving the decimal slide P67 so that the cam A engages the end 73OP.

*Mechanism for effecting distinctive printing by carriage position*

The present improvements particularly relate to this part of the machine, the preceding description of other mechanisms having been given to afford adequate disclosure of those mechanisms which may be used in the same machine. It is to be understood, however, that the control of distinctive printing by the position of the carriage, according to the present invention, is not limited to use with the locking mechanism for the starting bar and for the total and sub-total keys, or to the overdraft mechanism, as it need only be used in connection with ribbon-shift mechanism and signal or distinctive printing mechanism.

The shaft I1 may be turned without shifting the decimal slide by improved means arranged to be operated when the operator returns the carriage to the credit, or any desired, column by the use of a shiftable manually held stop on the carriage so that the first following item printed by the machine will be in a distinctive color as, for instance, red, to denote a credit item in department store work, for instance. Reference is to be had to my Patents Nos. 1,550,945 and 1,731,701 in this connection and to the following mechanism.

Referring to Figs. 1, 2, 3, 5, 6, the shaft I1 is provided with a crank C on its left hand end which is normally disengaged from the crank N68$^b$ that operates the locks for the keys K63, K64. There is pivoted to the left hand end of the plate F554 (Fig. 5) of the tabulating section of the machine, a small bell crank lever C1 whose upright arm is connected to the upper end of the crank C by a link C2. The other arm of the bell crank lever C1 has a pin and slot connection C3 with a link C4 which is pivoted to the rear end of lever L53L disclosed in my Patents Nos. 1,550,945 and 1,731,701. Pivoted at F23F to the rear face of the plate F554 is a bell crank lever F64 whose horizontal arm lies underneath the lever L53L and whose upright arm carries a horizontally arranged hook F65, pivoted to the bell crank lever at F20. Engaged with the hook F65 is a pull strip 60B which has a turned up end 60B$^a$. There is provided a fixed stop or abutment X93 on the plate F554 against which the turned up end 60B$^a$ will strike when the pull strip 60B is moved to the right, Fig. 5.

The rack stop bar which is carried by the traveling carriage of the Ellis machine appears at C91. The purpose of this bar is to carry, in any position desired, the settable or adjustable stops by which the different mechanisms of the machine are controlled according to predetermined positions of the carriage. As shown in my Patent Nos. 1,550,945 and 1,731,701, a stop XC95 may be used on the carriage bar C91 to cooperate, when set, with the hook F65 for the purpose of turning the lever F64 for purposes set forth in said patents.

Another stop XC96, which has particular reference to the mechanism for setting the ribbon to cause distinctive printing, is adjustably carried by the bar C91 and has a lever 50X pivoted at $b'$. A spring is provided so that the lever 50X is normally held in the inoperative position shown in Fig. 5. When the finger of the operator is pressed against the lever 50X, the toe or point of the stop is lowered so that it may engage the upturned end 60B$^a$ of the pull strip 60B.

In department store ledger work, where credit items such as partial or full payments or credit for the return of an article, are to be printed, these amounts should be deducted from the balance due from the customer to the store. To enter such an item, the operator presses against the lever 50X which brings its point in line with the upturned end 60B$^a$ and in the operation of moving the carriage to the right, the strip 60B is thereby shifted until stopped by striking the abutment X93. My Patents Nos. 1,550,945 and 1,731,701 set forth mechanism operated by the bell crank lever F64 by which the subtraction key K67 is depressed when the lever 50X is engaged by the finger of the operator and brought into contact with the end 60B$^a$ to pull the strip 60B against the abutment X93. No claim is made to this mechanism per se in the present application but by combining with this mechanism the connections heretofore described leading to the crank C on the shaft I1, when the hook F65 is pulled to the right, Fig. 5, the link C2 causes the shaft I1 to be turned to draw back the link 55I and swing the arm 54I into engagement with the stud 112I (Fig. 9). Thus, the ribbon mechanism is set so that when the credit item, in this class of work, is printed on the next operation of the machine, it will be printed in a distinctive color, for instance red.

The operation of the machine restores the ribbon mechanism to normal position. The crank C may be made to cooperate with the crank N68<sup>b</sup> in lieu of using the crank 60E which cooperates with the crank N68<sup>a</sup> as previously described.

*Signal printing mechanism*

In Fig. 10, signal printing mechanism is shown embodying improvements on the signal mechanism of the Ellis Patent No. 1,065,792, June 24, 1913, and, also, novel means for printing a sign opposite an item which represents that a corresponding amount has been subtracted from the amount or amounts stored in the accumulator or accumulators.

The platen of the machine is shown at P. The cams which swing the frames 51N—56N carrying the accumulator wheels N50 to cause said wheels to engage or disengage the racks are secured to the shafts N1 and 1N of the upper and lower accumulators. The upper cam N67R has a pin 11A and the lower cam 67NR has a similar pin 11A. A forked arm 60P which is pivoted at P10P is normally free from engagement by the pins 11A of both cams N67R and 67NR. The cooperation of the pins 11A of the upper and lower cams with the forked arm 60P is the same as explained in the Ellis Patent No. 1,065,792, the pin 11A of the upper cam N67R being adapted, when said cam is moved, to swing the forked arm 60P a shorter distance to the left than will occur when the lower cam 67NR moves.

These movements are transmitted to the signal or sign printing arm 65P so that either a "D" sign will be brought into line to print, or a "C" sign, as the case may be.

Sign printing arm 65P is pivoted on the same center P10 as that of the right hand printing type segment P54 of the printing group, the sign printer and the right hand segment P54 being carried by pivoted arm P52. Each printing segment P54 is operated by its own link P53 as will be understood from the Ellis patents, for instance, No. 1,065,792.

Pivoted on the screw pin P10P is a lever 61P to which reference has heretofore been made, said lever being connected to arm 60P by a contractile coil spring P88 attached at P11P, the tendency of the spring being to draw the lever 61P upwardly. As distinguished from the operative connection between lever 61P and the signal printing arm as set forth in Ellis Patent No. 1,065,792, there is provided a link 23.55, said link being provided with a slot 23<sup>a</sup> and having pins 23.12 and 23.13. A stud 23P17P is carried by the lever 61P and projects into the slot 23<sup>a</sup>. A contractile coil spring P81 has one end connected to the pin 23.13, its other end being attached to the stud or pin 23P17P. This spring tends to normally pull the link 23.55 downwardly so that the upper end of the slot 23<sup>a</sup> abuts the pin 23P17P.

Pivoted on the screw pin P10P back of the forked arm 60P is a bell crank lever 23.52 whose horizontal arm bears on the stud 23P17P. The bell crank lever 23.52 has a pin 23.52<sup>a</sup>. A contractile coil spring P80 which is connected to the pin 23.52<sup>a</sup> is of sufficient strength, when stretched by the movement of the bell crank lever 23.52 to the position shown in Fig. 10, to overbalance the spring P81 and to thereby overcome the tendency of said spring to draw down the link 23.55 and consequently, when the bell crank lever 23.52 is thus shifted, the signal printing arm 65P is shifted so that the signal used to identify a subtracted item will be brought to the printing line.

The shift bar N90 carries on its right hand end an arm 23.54 to which is pivoted a link 23.53 having a fork which straddles a stud 23.11 carried by the downwardly extending arm of the bell crank lever 23.52. When an operation of subtraction is carried on, the shift bar N90 moves to the position shown in Fig. 10, this action putting the spring P80 under such tension that it overbalances the spring P81 and elevates the link 23.55 and moves the signal printer 65P a greater distance than it would travel if the shift bar N90 was not operated although a printing operation was taking place. Consequently the signal printing arm 65P travels a greater distance when a subtracting operation is performed than it does when other operations take place.

A detent 62P, which is pivoted at P14P has its lower end adapted to cooperate with the paper feed lever P74 in the manner set forth in Patent No. 1,065,792. A contractile coil spring P85 which is attached to a stud P12P on the lever 61P and to a stud P13P on the detent 62P tends to turn the detent 62P in a clockwise direction. The detent 62P is provided with notches 1, 2, 3, which are adapted to engage the stud P12P to lock the lever 61P, according to the position of the latter, when the paper feed lever P74 has moved.

If the machine is set for the performance of addition, at the time the paper feed lever P74 moves, the detent 62P is swung by its spring P85 so that the notch 1 engages the pin P12P and thus holds the signal printing arm 65P in inoperative position so that no sign or signal of the series carried thereby will be brought to the printing line.

If the machine is set for taking either a "DR" total or sub-total, the movement of the forked arm 60P shifts the lever 61P and the notch 2 then engages the pin P12P and locks the lever 61P and the link 23.55 so that the printing arm 65P is held in the proper position to print the sign or signal, for instance "D". If the machine is set to take a "CR" total or sub-total, the forked arm 60P is moved as explained in the Ellis Patent No.

1,065,792 and the lever 61P is correspondingly moved and notch 3 then engages pin P12P so that the proper sign, say "C" of the printing arm 65P is locked in position to be brought to the printing line when the machine is operated.

The slidable set link 73P is provided with a depending cam plate P90. The lever 61P has a roller P91 which is so disposed when the set link 73P is in its normal position it does not interfere with the roller P91 and there is no interference with the usual movements of the lever 61P. When, however, an "overdraft" has occurred, the operator is apprised of that fact by the locking actions hereinbefore set forth and it becomes necessary for the decimal slide P67 to be moved to its extreme left hand position for the purpose of causing the cam A to engage the point 730P of the set link 73P. This results in shifting the set link 73P rearwardly which brings the cam end of the plate P90 over the roller P91 and into engagement therewith, thus depressing the lever 61P. As the normal tendency of the spring P81 is to pull the link 23.55 downwardly so that the upper end of the slot 23ª is against the stud 23P17P, this action of cam P90 on roller P91 results in swinging the signal printer 65P to such position that when the machine is operated a suitable identifying or distinguishing sign, such as "CR", which has been brought to the printing line prints opposite the overdraft item. Assuming that the ribbon shift mechanism heretofore described is used, the identifying sign "CR" will be printed in a distinguishing color, say red, on the "original" or outer sheet of the platen P and it will also appear on all carbon copies being taken so that overdraft items are identified on all copies, just as total, sub-total, and subtracted items are identified by their respective signs as previously described.

The precise signs used to identify totals, sub-totals, subtracted items, and overdraft items may vary as any desired signs or signals may be employed. I have shown and described printing type such a "CR" for a credit balance or overdraft item identifying mark; "D" as a mark or signal representing the contents of the debit accumulator; "C" as a signal to represent the contents of the credit accumulator; and "S" to represent a subtracted item.

What I claim is:

1. In a calculating machine, the combination with an accumulator, of actuators therefor, a keyboard controlling the actuators on which any desired number may be set up for accumulation on the subsequent operation of the machine, printing means, operating means for putting the machine through its cycle of operations, a travelling carriage, a stop mounted on said carriage and which is adapted to be set either for utilization, or, in inoperative position, means which is settable for printing an item in a distinctive manner, and means operable by the said stop only when the carriage is in a pre-determined position, provided said stop has been set for co-operation therewith, for causing said printing means to be thereupon automatically set for distinctive printing on the subsequent operation of the machine by said operating means.

2. In a calculating machine, the combination with a traveling carriage, of a normally inactive, self-restoring stop mounted on the carriage and arranged to be manually set and held, in operative position while thus mounted on the carriage, means which is settable for printing an item in a distinctive manner, and means operable by the stop when the carriage is in a pre-determined position, provided said stop is manually held in operative position, for causing said printing means to be set for distinctive printing.

3. In a calculating machine, the combination with an accumulator, of actuators therefor, a keyboard controlling the actuators on which keyboard any desired number may be set up for accumulation on the subsequent operation of the machine, printing means, operating means for putting the machine through its cycle of operations, a travelling carriage, a stop mounted on the said carriage and which is adapted to be set either for utilization, or, in inoperative position, inking means which is settable for printing in different colors, said means being normally arranged for printing items in a given color, and means operable by the said stop only when the carriage is in a pre-determined position, provided said stop has been set, adapted for setting the inking means so that the next item set up on the keyboard will be printed in a distinctive color on the operation of the machine.

4. In a calculating machine, the combination with an accumulator, of actuators therefor, a keyboard controlling the actuators, printing means, operating means for putting the machine through its cycle of operations, a traveling carriage, a stop mounted on the carriage, and which is adapted to be set either for utilization, or in inoperative position, inking means which is settable for printing in different colors, said means being normally arranged for printing items in a given color, means operable by the stop when the carriage is in a pre-determined position, provided said stop has been set, adapted for setting the inking means so that the next item set up on the keyboard will be printed in a distinctive color on the next operation of the operating means, and means for automatically restoring the inking means to position for normal color printing after the printing means has printed the item in a distinctive color on the operation of the machine.

5. In a calculating machine, the combination with a traveling carriage, of a normally inactive, self-restoring stop mounted on the carriage arranged to be manually set and held, in operative position while thus mounted on the carriage and which is adapted to be set for utilization, or in inoperative position, inking means which is settable for printing in different colors, said means being normally arranged for printing items in a given color, means operable by the stop when the carriage is in a pre-determined position, provided said stop is manually held in operative position, for setting the inking means so that the next item will be printed in a distinctive color on the next operation of the machine, and means for restoring the inking means to position for normal printing thereafter on the release and restoration of said stop.

6. In a calculating machine, the combination with actuators, of an accumulator comprising a single set of registering wheels adapted to be directly engaged with said actuators and turned thereby in one direction for addition or in the opposite direction for subtraction, and transfer mechanism constituting a part of said accumulator, means for setting the accumulator to perform either addition or subtraction, means for operating the accumulator, a subtracting device cooperatively related to the means for setting accumulator, a subtraction key, and means operated by the subtraction key which causes the subtracting device to assume an operative position when said subtraction key is set.

7. In a calculator, the combination with actuators, of an accumulator comprising a single set of registering wheels adapted to be directly engaged with said actuators and turned thereby in one direction for addition or in the opposite direction for subtraction, and transfer mechanism constituting a part of said accumulator, means whose setting determines whether addition or subtraction will be performed in the accumulator, a subtraction key, a subtracting hook operatively connected to the means which determines whether the accumulator will perform addition or subtraction, means operated by the subtraction key by which the subtracting hook is arranged in operative or inoperative position according to whether the subtraction key is set or is in normal position, and means for operating the accumulator, said means normally having no effect on the subtracting hook but being adapted to operate said hook when the subtraction key is set.

8. In a calculator, the combination with actuators, of an accumulator comprising a single set of registering wheels adapted to be directly engaged with said actuators and turned thereby in one direction for addition or in the opposite direction for subtraction, and transfer mechanism constituting a part of said accumulator, means whose setting determines whether addition or subtraction will be performed in the accumulator, a subtraction key, a subtracting hook operatively connected to the means which determines whether the accumulator will perform addition or subtraction, a set link operated by the subtraction key which is adapted to normally hold the subtracting hook in inoperative position and, when the subtraction key is set, to cause the subtracting hook to assume an operative position, a crank for operating the accumulator, said subtracting hook being normally arranged in inoperative position and positioned, when the subtraction key is set, so that it will be operated by the crank for the purpose of setting the accumulator for subtraction.

9. In a calculator, the combination with an accumulator, of a rockable shift bar whose position determines whether the accumulator will perform addition or subtraction, a crank carried by the shift bar, a substracting hook yieldingly connected to the crank aforesaid, means for arranging the accumulator in operative or inoperative position, an adding crank for operating said means, a subtraction key, means operated by the subtraction key which cooperates with the subtracting hook to normally hold said hook in inoperative position and which is adapted, when the subtraction key is set, to permit the subtracting hook to be operated by the adding crank aforesaid.

10. In a calculator, the combination with an accumulator, of a rockable shift bar whose position determines whether the accumulator will perform addition or subtraction, a crank carried by the shift bar, a subtracting hook yieldingly connected to the crank aforesaid, means for arranging the accumulator in operative or inoperative position, an adding crank for operating said means, said adding crank being provided with a pin from which the subtracting hook is normally free, a subtraction key, and a set link operated by the subtraction key which normally holds the subtracting hook so that it will not be engaged by the pin on the adding crank and which permits the subtracting hook to be positioned for engagement by the pin when the subtraction key is set.

In testimony whereof I affix my signature.

FREDERICK W. BERNAU.